July 21, 1931.  C. P. BYRNES  1,815,547
GLASS GRINDING
Filed Jan. 30, 1923   5 Sheets-Sheet 3
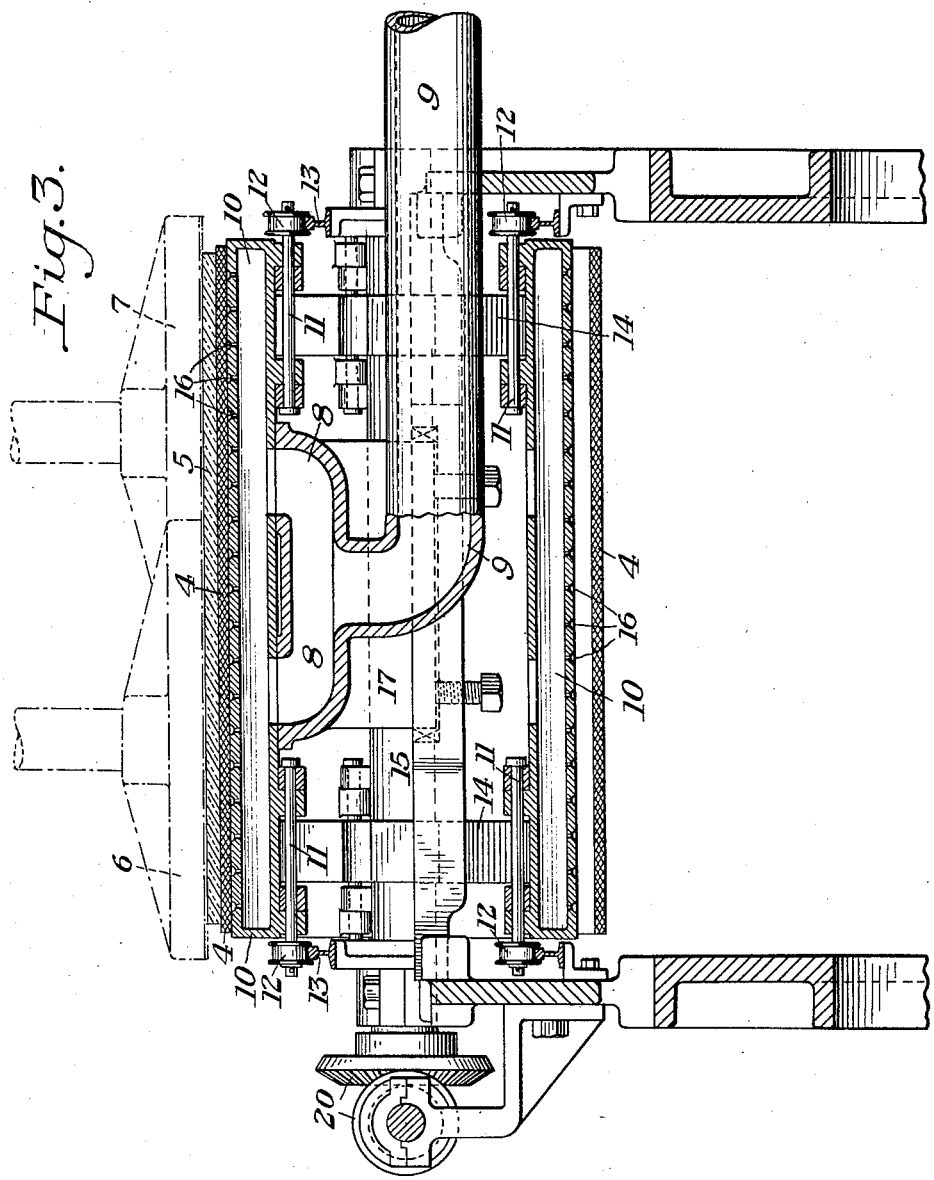
INVENTOR
Clarence P. Byrnes

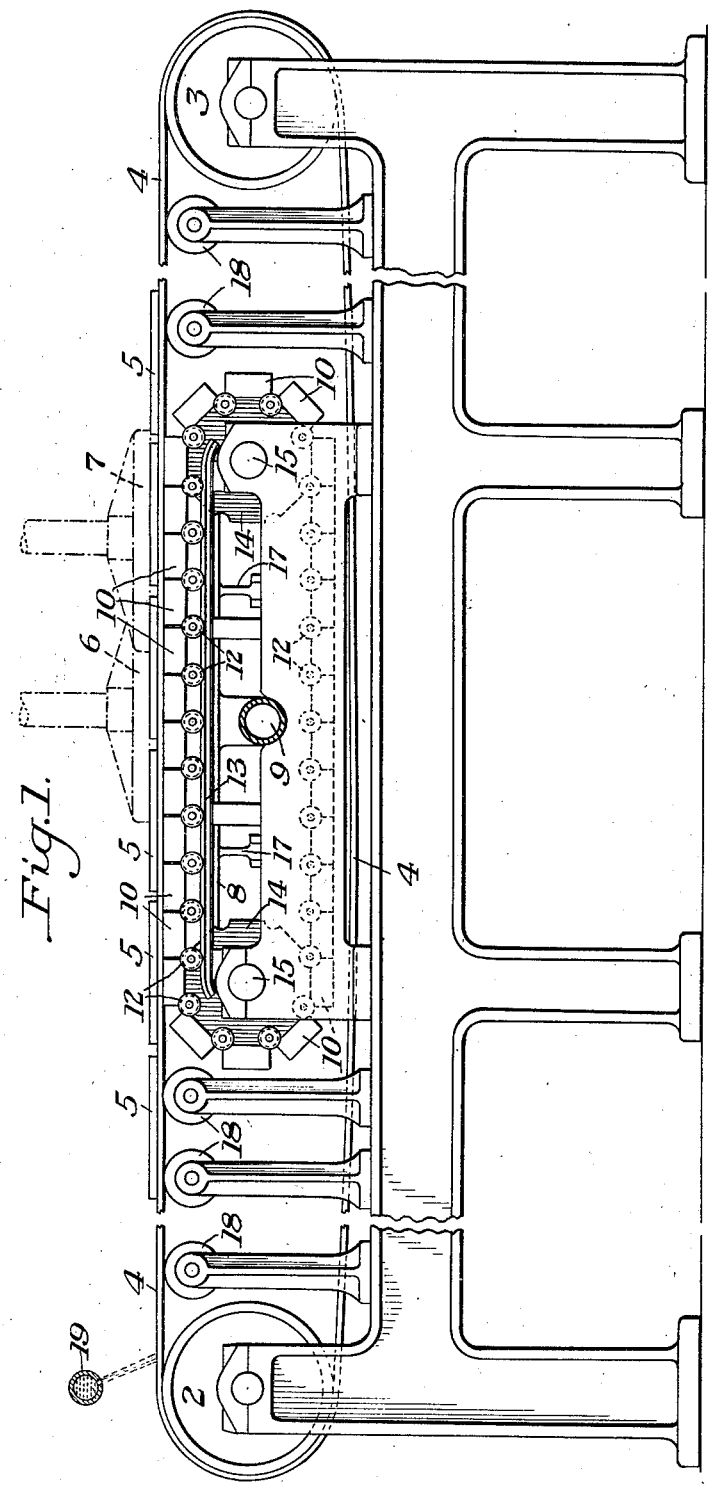

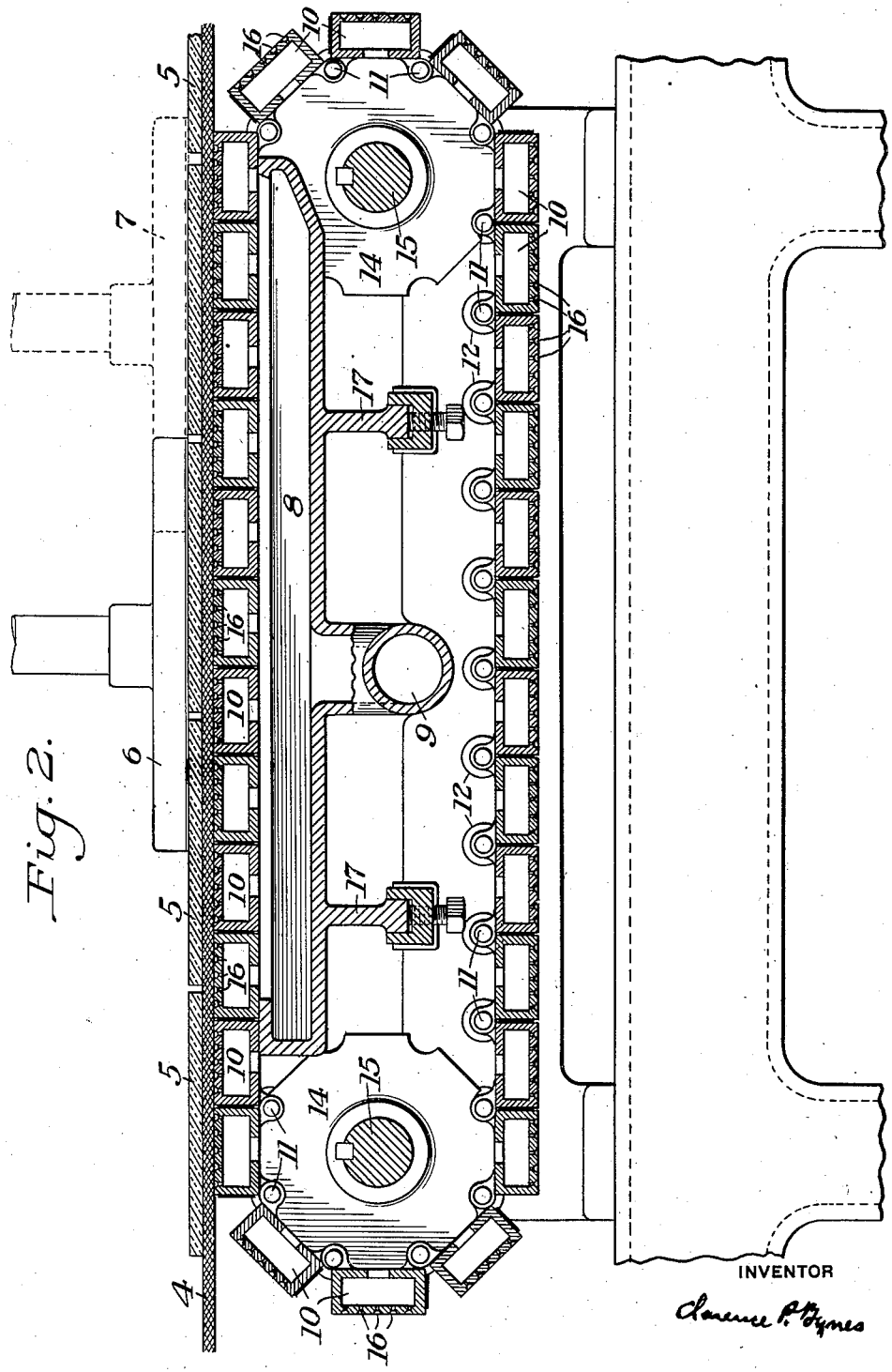

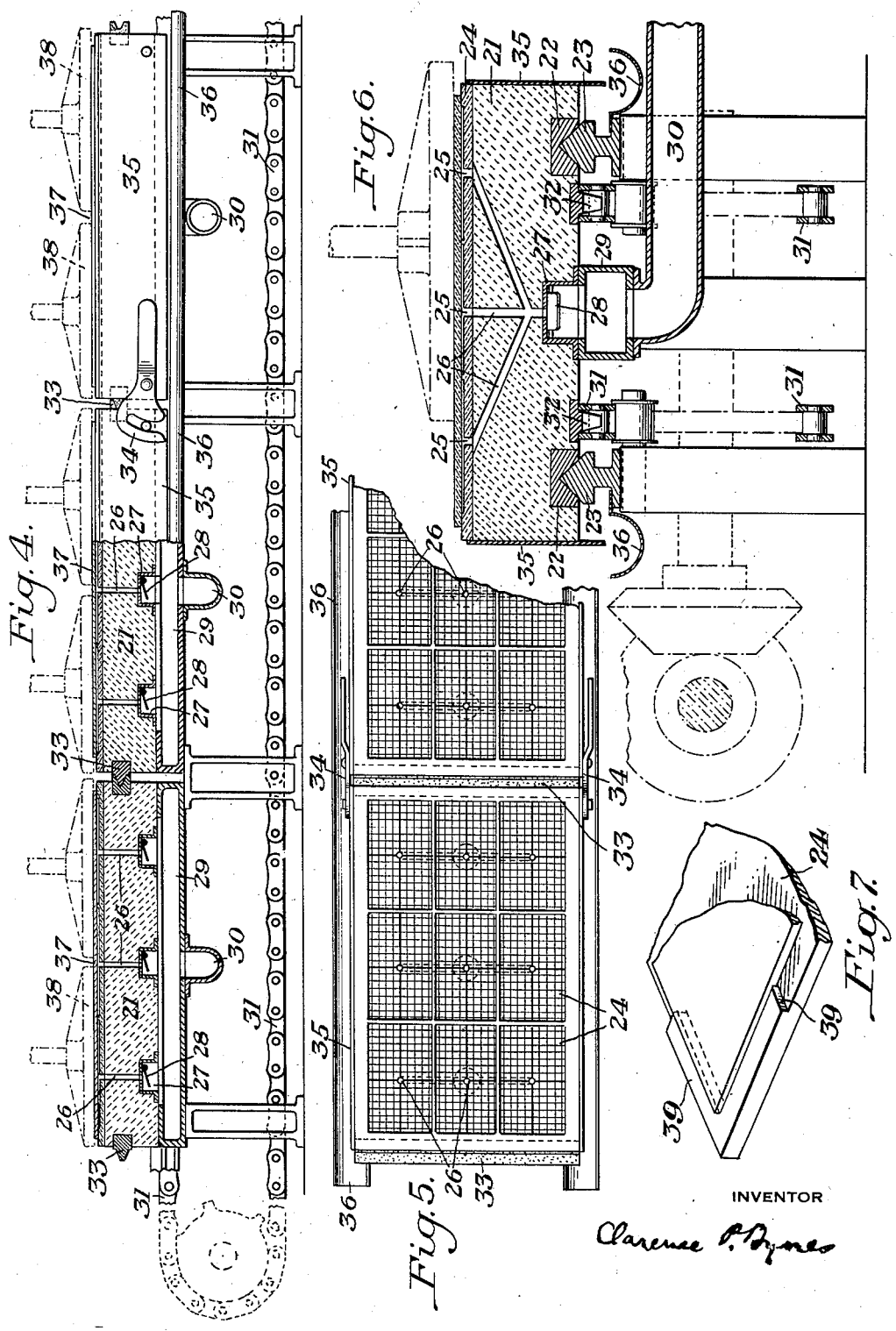

July 21, 1931.  C. P. BYRNES  1,815,547
GLASS GRINDING
Filed Jan. 30, 1923   5 Sheets-Sheet 5

INVENTOR
C. P. Byrnes

Patented July 21, 1931

1,815,547

UNITED STATES PATENT OFFICE

CLARENCE P. BYRNES, OF SEWICKLEY, PENNSYLVANIA

GLASS GRINDING

Application filed January 30, 1923. Serial No. 615,829.

Figure 1 is a side elevation, partly broken away, showing one form of apparatus for carrying out my invention;

Figure 2 is an enlarged longitudinal section of a portion of the same;

Figure 3 is a central cross section of the portion shown in Figure 2;

Figure 4 is a side elevation partly in section showing another form of the invention;

Figure 5 is a plan view;

Figure 6 is a cross section;

Figure 7 is a detail perspective view hereinafter referred to, and

Figure 8:
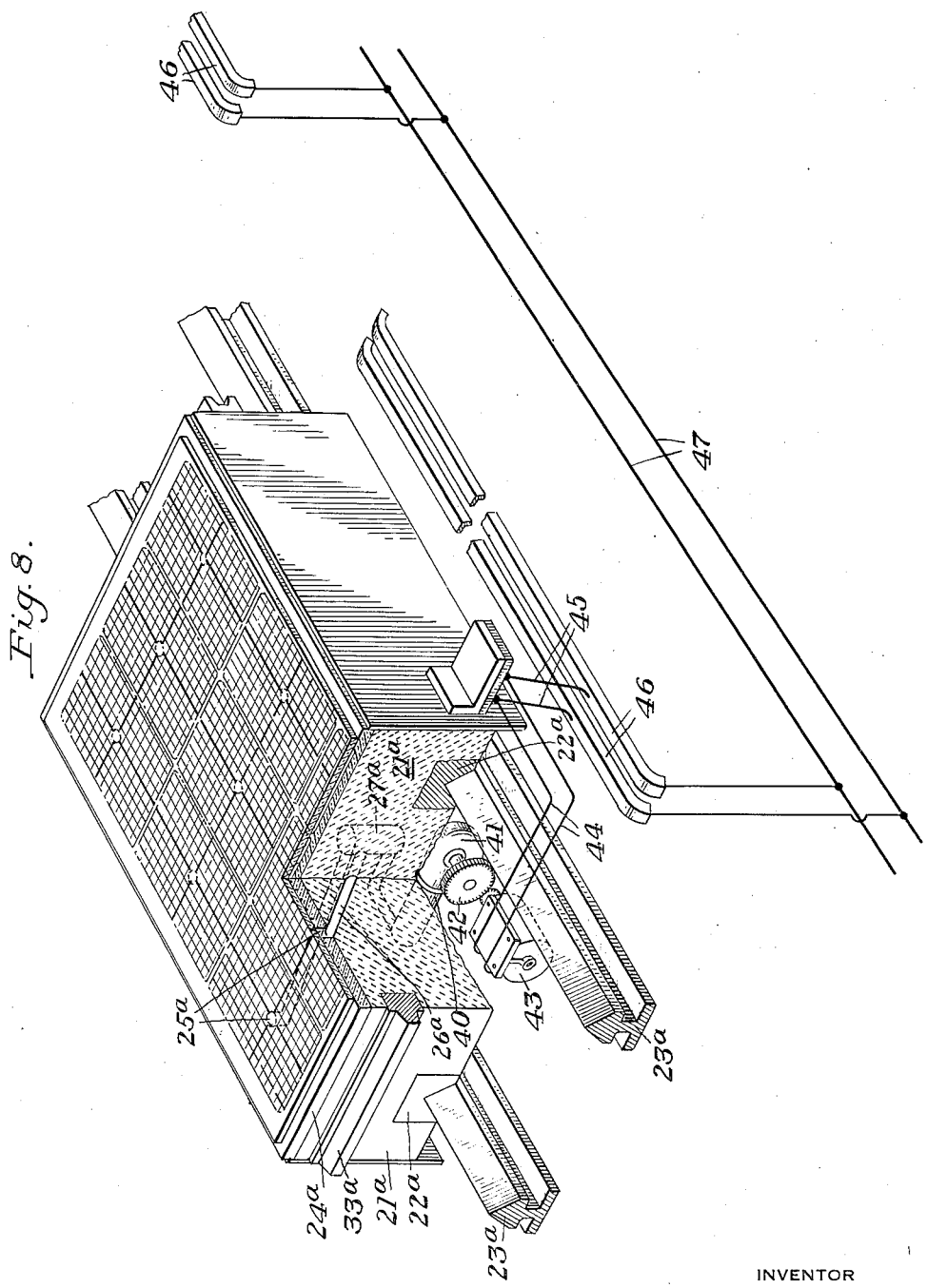
Figure 8 is a diagrammatic perspective view showing a modified form.

My invention relates to the grinding and polishing of flat glass, and is particularly directed to the grinding and polishing of glass on a carrier. The invention is designed to do away with the bedding of the glass in plaster of Paris or similar material, and to apply the suction system by holding the glass to a traveling carrier, as distinguished from a rotary table. Certain features of the invention are not limited to a suction system.

Referring to Figures 1 to 3 of the drawings, in which I show one form of apparatus for carrying out the invention, 2 and 3 represent end drums over which travels a continuous web 4, which is preferably of a thick, porous cloth or woven material in the form of a belt. Either one or both of these drums may be driven. The drums may be spaced at any desirable distance apart, depending on whether both sides of the sheet are ground and polished on the same belt or on different belts; also depending on the number of grinders, etc. At an intermediate point in the upper path of the belt on which the glass plates or sheets 5 to be ground and polished are placed and carried, I locate underneath this belt for a certain portion of its distance a traveling suction device adapted to hold the sheets on the belt by suction, while they are being ground or polished or both, by any usual or desired form of grinding disks or devices, such as indicated in dotted lines at 6 and 7. The traveling suction device is preferably in the form of an endless chain or linked together boxes, forming an endless chain, and of a proper length to hold the glass by suction during the action of the grinders or polishers, or both, while the glass is traveling either continuously or step by step. The suction is preferably applied to the sheets or plates through the porous web on which they lie, and the suction devices forming part of the chain preferably move over a stationary suction box, although any desired form of suction apparatus may be employed beneath a portion or portions of the upper path of the traveling web.

In the form shown, 8 is the stationary suction box extending longitudinally and centrally beneath the center of the suction device, having a pipe or conduit 9 extending to a suitable suction apparatus. This box has a slot or slots in its upper face adapted to register with a similar slot or slots in each of the traveling boxes 10. These boxes are hinged together upon suitable shafts 11, which preferably carry rollers 12, traveling on side tracks 13. The outer portions of the traveling boxes are therefore carried on the rollers, while the inner portions have sliding substantially air-tight connection with the upper face of the stationary suction box. The shafts 11 are linked together in the form of chains to make an endless carrier traveling over the suitably shaped sprocket wheels or rollers 14. One or both of the shafts 15 of these sprocket wheels may be driven by suitable connections, and the speed of travel of the boxes may be the same as or different from the speed of travel of the fabric belt 4, although it is preferably driven at the same speed.

The upper faces of the traveling boxes 10 are provided with sets of perforations 16, preferably having cup-shaped upper ends so that the suction action may be exerted through the cavities in the boxes, through these openings and through the traveling belt upon the glass plates. The traveling boxes may be of such size that there is a plurality of them under a sheet or plate of glass, or the boxes may be made of a size somewhat larger than one sheet of glass so that there will be a sheet of glass lying on each box. The stationary suction box 8 may be carried on suitable adjustable supports 17, and any or all of the parts may be adjustably mounted so as to bring them into proper relation. At those points in the upper travel of the fabric belt which are beyond or between the suction devices, the belt may be suitably supported, as by rollers, indicated at 18.

The belt is preferably supplied with water, and this may be applied as indicated at 19 by a suitable spray pipe near one end portion of the upper portion of the traveling fabric belt, but the glass plates are applied or may be applied in other ways. If desired, the traveling suction boxes may be provided with open-topped water-supplied grooves in their upper faces to regulate the temperature and aid in holding the suction on the under surface of the sheets or plates.

The sprocket wheels 14 may be connected by bevel gearing indicated at 20 in Figure 3, if desired, and the stationary suction box may, if desired, be given a slight side movement by cams operating on its supporting frame, in order to avoid grooving of the coacting sliding surfaces of the stationary and movable suction boxes.

In using the apparatus, the fabric web is driven and the suction boxes are correspondingly driven, preferably at the same speed and in the same direction. Water may be supplied to the traveling web. Glass plates or sheets are then fed upon the traveling web, and as they reach the suction device, suction being applied through the relatively stationary connection, the plates are held by suction on the traveling belt, while the grinding or polishing devices or both act upon their upper surfaces. These grinding devices may be supplied with sand or other abrasive material in the usual manner, and may have a rotary motion or a combined reciprocating and rotary motion or any other motion desired. Each grinding or polishing disk may extend the full width of the sheets and traveling device or may extend part way across it, the disk being staggered, if desired, as shown. The traveling parts may be actuated either continuously or step by step.

If the traveling fabric belt is of sufficient length, a plurality of the suction devices may be placed at different parts of its length, and grinding and polishing may thus be carried out at different points in the travel of the belt, and if desired, the plates may be turned over between the suction devices and thus ground and polished on both sides. Several of the same systems may be located side by side, and the plates removed from one, carried, turned over and placed on the other and ground or polished, or both, while holding them by suction devices in a similar manner to that shown.

In Figures 4, 5 and 6, I show a modified form in which the carrier consists of a series of tables or beds 21, which may be made of concrete having embedded therein metal guides or trackways 22, arranged to move on V-shaped tracks 23. In this case, each bed is shown as provided with a relatively thick glass plate 24, which may be cast upon the bed or table, and the upper surface of which is plane and flat, this glass plate having small holes 25, which, through tubes or conduits 26, connect with traveling suction boxes 27, each having an upwardly closing flap valve 28, to close the channel 26 when normal air pressure reaches this valve.

The upper face of the glass plate is scored with light grooves, as shown, the system of grooves connecting with the small suction holes to distribute the suction over the face of the table. I have shown three such portions of the plate separated by margins connecting with three suction cavities, but the system may, of course, be varied as desired in this regard. The traveling suction boxes 27 travel over stationary suction boxes 29, having slotted tops to register with the suction cavities in the beds and provided with a suction conduit 30, leading to suitable air pumps.

The beds may be moved along on the tracks by any suitable devices, such as chains 31, engaging racks 32 in the beds or in any other suitable way. The beds are preferably provided at their ends with intermatching rubber gaskets 33, and the beds may be held together by side cam latches 34, which are adapted to compress the gaskets and prevent sand and water used in grinding from passing down between the ends of the beds upon the tracks, etc. These interlocking connections also help to maintain the evenness and proper level of successive beds. The sides of the beds may be provided with sheet metal plates 35, over which the abrasive and water run down into gutters 36, from which the sand may be collected, regraded, etc. 37 indicates sheets to be ground and polished, and 38 the grinders or polishers which may be of any desirable type.

In this system, as the glass sheets are fed upon the beds, the beds may be latched to each other and brought successively into the operation of the chain, so that the line of beds is moved gradually forward under the grinding devices. There may be several sets of the grinding or polishing devices, and water may be supplied to wash off the various grades between the successive grinding operations as the sets of beds move forward. When the glass is removed, the beds may be returned on parallel tracks to bring them back to the starting point to receive further glass sheets. The suction boxes are, of course, continued under those portions of the bed travel where grinding, polishing, etc., are carried out, so as to hold the sheets by suction during the grinding and polishing operations. If desired, the thick grooved glass plates of the beds may be provided with a layer of webbing, porous paper or other similar material which will more completely distribute the suction over the lower surface of the sheet.

The thick glass plates may be provided with low ledges, of less height than the thickness of the sheet being ground, along one side or one side and one end of the glass sheets laid on, and when the glass sheet is applied, it may be moved against this low ledge or ledges, to resist the tendency to rotation of the sheets under the action of the grinders. One or more glass sheets may be placed on each table. Thus in Figure 7 I show a form of the thick glass plate support for the sheets, which is provided at the corner or corners with low ledges 39 of less thickness than the thickness of the glass being ground.

Instead of using a stationary suction box cooperating with traveling suction connections on the carrier, I may employ, particularly in the form of Figures 4, 5 and 6, a self-contained system on each table or set of adjacent tables. Thus each table may carry a suction pump and an electric motor, the motor having traveling contacts which move over an electric supply system so that the motor may be driven when and if desired during the travel of the bed or beds to set up the suction through the period desired.

Thus in Figure 8, 21a represents one of the beds having metal guides 22a on V-shaped tracks 23a. 24a is the thick glass plate having suction holes 25a with conduits 26a connected to the common chamber 27a having a conduit 40 connected to a rotary air pump 41. The rotor of the pump 41 is connected through slow motion gearing 42 to an electric motor 43 mounted on the bed and having suitable wires 44 connected to trolley contacts 45 traveling over spaced intermittent conductors 46. Parts of two sets of these conductors are shown, both being connected to the main lead wires 47. In this form each bed carries its self-contained suction system, the driving electric motor being actuated or disconnected as the trolley contacts pass over the intermittent conductors.

The traveling carrier may be changed in many ways and many other changes may be made without departing from my invention, since I consider myself the first to hold glass plates or sheets to be ground by suction on a traveling carrier during the grinding operation. It will be noted that in accordance with this invention, the suction support moves bodily instead of being a mere rotary table.

The advantages of my invention result from the rapidity and cheapness of the operations, since bedding in plaster of Paris and breaking away the plates after grinding or polishing is done away with, and the glass held by suction during these operations.

I claim:

1. In glass grinding or polishing apparatus, a track, a plurality of supporting members movable on the track and arranged to present a substantially plane supporting surface when they are on such track, suction passages in the several supporting means whereby glass may be held thereon, connections arranged to maintain the suction upon the glass at different positions along the track, and a grinding or polishing device arranged to cooperate with the supporting members.

2. In glass grinding or polishing apparatus, a track, a plurality of supporting members movable on the track and arranged to present a substantially plane supporting surface when they are on the track, the supporting members being separable from one another and having conecting means whereby they may be secured in a row along the track and caused to move together, suction passages in the several supporting means whereby glass may be held thereon, connections arranged to maintain the suction upon the glass at different points along the track, and a grinding or polishing device arranged to cooperate with the supporting members.

3. In glass grinding or polishing apparatus, a track, a plurality of supporting members movable on the track and arranged to present a substantially plane supporting surface when they are on such track, the several supporting members being separable from one another and having means for locking adjacent supporting members together, suction means for holding glass sheets upon the supporting members, and a grinding or polishing device associated with the supporting members.

4. In glass grinding or polishing apparatus, a track, a plurality of supporting members movable on the track and arranged to present a substantially plane supporting surface when they are on the track, the supporting members being separable one from another, tongue and groove connections between the supporting members, mechanism detachably and intermittently engaging successive members to move them along the track, and abrading mechanism arranged to act upon glass plates lying on said members supported on the track.

5. In glass grinding or polishing apparatus, a track, a plurality of supporting members movable on the track and arranged to present substantially plane supporting surfaces when on said track, each supporting member being separable from the adjacent supporting member and independently removable from the track, conections for moving the supporting members successively along the track in the same direction, abrading mechanism arranged to act successively upon glass plates lying on said members supported on the track, means for closing the end joints between the movable supporting members and a relatively stationary trough arranged to receive abradant flow from the glass plates while thus supported.

6. In glass grinding or polishing apparatus, a track, a plurality of supporting members movable on the track and arranged to present substantially plane supporting surfaces when on said track, each supporting member being separable from the adjacent supporting member and independently removable from the track, connections for moving the supporting members successively along the track means for closing the end joints between the movable supporting members, and abradant mechanism arranged to act successively upon glass plates lying on said members.

7. In glass grinding or polishing apparatus, a track, a plurality of supporting members movable on the track and arranged to present substantially plane supporting surfaces on said track, each supporting member being separable from the adjacent supporting member and independently removable from the track means for closing the end joints between the movable supporting members, connections for moving the supporting members successively along the track in the same direction, abrading mechanism arranged to act successively upon glass plates lying on said members, and an overflow receptacle arranged to receive fluid and abradant from said supporting members.

8. In a glass grinding or polishing apparatus, a track, a plurality of supporting members movable on the track and arranged to present substantially plane supporting surfaces while on said track, means for moving them along the track, suction means for holding glass sheets upon the supporting members, means for operating the suction means in a predetermined position of the supporting members on the track and a glass grinding or polishing device associated with the supporting members.

9. The combination with a surfacing car or table mounted for movement along a track and having a glass supporting surface, of a suction conduit leading from the table, means for applying the suction at a predetermined position of the table along the track and abradant mechanism arranged to act upon a glass plate mounted on the car or table.

10. The combination with a surfacing car or table mounted for movement along a track and having a glass supporting surface, of means for producing a suction effect intermediate said supporting surface and the glass carried thereby, and means operated by the movement of the table along the track for actuating said means to secure the glass to the table.

11. The combination with a surfacing car or table mounted for movement along a track and having a glass supporting surface, of means for producing a suction effect intermediate said supporting surface and the glass carried thereby, means for actuating said means, to secure the attachment by suction of the glass to the table, and means actuated by the movement of the table along the track for releasing the suction to free the glass from the table.

12. The combination with a surfacing car or table mounted for movement along a track and having a glass supporting surface, of means for producing a suction effect intermediate said supporting surface and the glass carried thereby, automatic means operated by the movement of the table along the track for actuating said means to secure the glass to the table, and means actuated by the movement of the table along the track for releasing the suction to free the glass from the table.

13. The combination with a surface car or table mounted for movement along a track and having a glass supporting surface, of means for producing a suction effect intermediate said supporting surface and the glass carried thereby, and means operated by the movement of the table along the track for causing said suction effect to secure the glass to the table.

14. The combination with a surface car or table mounted for movement along a track and having a glass supporting surface, of means for producing a suction effect intermediate said supporting surface and the glass carried thereby, and means operated by the movement of the table along the track for causing said suction effect to secure the glass to the table, and for releasing said suction effect.

15. The combination with a surface car or table mounted for movement along a track and having a glass supporting surface, of means for producing a suction effect intermediate said supprting surface and the glass carried thereby, automatic means operated by the movement of the table along the track for causing said suction effect to secure the glass to the table and means operated by the movement of the table along the track for releasing the suction to free the glass from the table.

In testimony whereof I have hereunto set my hand.

CLARENCE P. BYRNES.

DISCLAIMER 1,815,547.—*Clarence P. Byrnes*, Sewickley, Pa. GLASS GRINDING. Patent dated July 21, 1931. Disclaimer filed February 20, 1932, by the *patentee*.

Hereby disclaims claims 6 and 7 of said patent, except where the "means for closing the end joints between the movable supporting members" includes quickly detachable coupling devices carried by at least one supporting member and engaging the next supporting member to force their end portions together, said end portions also having interfitting guides assisting in maintaining the supporting members on an even level.

[*Official Gazette March 22, 1932.*]